(12) United States Patent
Dhagat-Jander et al.

(10) Patent No.: US 9,489,973 B2
(45) Date of Patent: Nov. 8, 2016

(54) MAGNETIC DATA STORAGE USING INDUCED STRAIN OF A MAGNETOSTRICTIVE MATERIAL

(71) Applicant: STATE OF OREGON ACTING BY AND THROUGH THE STATE BOARD OF HIGHER EDUCATION ON BEHALF OF OREGON STATE UNIVERSITY, Corvallis, OR (US)

(72) Inventors: Pallavi Dhagat-Jander, Corvallis, OR (US); Albrecht Jander, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 14/767,057

(22) PCT Filed: Feb. 13, 2014

(86) PCT No.: PCT/US2014/016316
§ 371 (c)(1),
(2) Date: Aug. 11, 2015

(87) PCT Pub. No.: WO2014/127163
PCT Pub. Date: Aug. 21, 2014

(65) Prior Publication Data
US 2015/0380038 A1    Dec. 31, 2015

Related U.S. Application Data

(60) Provisional application No. 61/764,495, filed on Feb. 13, 2013.

(51) Int. Cl.
*G11B 5/82* (2006.01)
*G11B 5/31* (2006.01)
*G11B 5/09* (2006.01)
*G11B 5/00* (2006.01)

(52) U.S. Cl.
CPC ............... *G11B 5/825* (2013.01); *G11B 5/09* (2013.01); *G11B 5/314* (2013.01); *G11B 2005/0005* (2013.01)

(58) Field of Classification Search
CPC ......... G11B 5/825; G11B 5/314; G11B 5/09; G11B 2005/0005; G11B 5/00; G11B 11/10504; G11B 5/1278; G11B 5/4907; G11B 5/4938; H02H 9/135; G11C 11/14; G11C 8/005; G11C 11/16
USPC ........ 369/13.01; 333/150, 93; 365/157, 121, 365/122; 360/59
See application file for complete search history.

(56) References Cited

U.S. PATENT DOCUMENTS

| | | | |
|---|---|---|---|
| 4,862,440 A | 8/1989 | Miyamoto et al. | |
| 5,239,504 A | 8/1993 | Brady et al. | |
| 6,046,657 A | 4/2000 | Alers et al. | |
| 8,023,218 B2 * | 9/2011 | Zhou | G11B 5/1278 360/59 |
| 2006/0117335 A1 | 6/2006 | Kino | |
| 2010/0128377 A1 | 5/2010 | Zhou et al. | |

OTHER PUBLICATIONS

Written Opinion for PCT/US2014/016316, mailed Jun. 18, 2014, 6 pages.
International Search Report for PCT/US2014/016316, mailed Jun. 18, 2014, 3 pages.

* cited by examiner

*Primary Examiner* — Ali Neyzari
(74) *Attorney, Agent, or Firm* — Klarquist Sparkman, LLP

(57) ABSTRACT

Acoustically assisted magnetic recording can be used in a hard disk drive or a solid state medium. In the described embodiments, otherwise unwriteable high-coercivity media are made amenable to recording by lowering their coercivity via strain induced by acoustic waves. The use of acoustic waves temporarily and locally reduces the magnetic field required to record information on a magnetic recording medium. The process makes use of the magnetostrictive property of a magnetic material by which the magnetic anisotropy of the material is changed by strain. The result of such a change is a reduction in the coercive field, i.e., the magnetic field required to reverse the magnetization direction. Because acoustic waves cause strain, the passage of an acoustic wave through a magnetic material can be used to reduce its coercive field.

22 Claims, 15 Drawing Sheets

SOFTWARE 1580 IMPLEMENTING DESCRIBED TECHNOLOGIES

MAGNETIC DATA STORAGE USING INDUCED STRAIN OF A MAGNETOSTRICTIVE MATERIAL

CROSS REFERENCE TO RELATED APPLICATIONS

This is the U.S. National Stage of International Application No. PCT/US2014/016316, filed Feb. 13, 2014, which was published in English under PCT Article 21(2), which in turn claims the benefit of U.S. Provisional Application No. 61/764,495, filed Feb. 13, 2013.

ACKNOWLEDGMENT OF GOVERNMENT SUPPORT

This invention was made with government support under Grant No: ECCS0645236-NSF awarded by National Science Foundation. The government has certain rights in the invention.

BACKGROUND

In hard disk drives (magnetic recording), it is generally desired to increase the density at which information is recorded on the disks as this leads to higher storage capacity and/or reduced cost. Currently the disk drive industry is facing a significant challenge in increasing storage density due to a problem of thermal stability: The very small volumes of magnetic material containing each bit of recorded information become unstable due to thermal agitation. A possible solution is to use a different material in the magnetic recording layer on the disk that has a larger anisotropy or coercive field. However, presently available materials used in magnetic recording heads cannot produce sufficient magnetic field to write on such high-anisotropy media. The problem is thus that the coercivity of the recording medium needs to be simultaneously low for writeability and high for thermal stability. Several approaches to get around this problem are being explored by the industry, including heat assisted magnetic recording (HAMR)(also called thermal-assisted magnetic recording) in which the recording layer is heated temporarily and locally by a focused laser beam or using microwaves.

In HAMR, reliable operation of the near field optical transducer used to focus the laser remains problematic. Additionally, the resulting high temperatures on a disk can degrade the lubricant on its surface.

DETAILED DESCRIPTION

A conventional hard disk drive includes one or more flat disks ("platters") having a thin coating of magnetic material. The disks spin via a motor drive about their axis on a spindle. A magnetic recording head is suspended above each surface of the disks supported by a slider at the end of an actuator arm. Due to aerodynamic flow propelled by the spinning disks, the sliders float on a thin layer of air known as an air bearing and do no physically touch the disks during operation. The actuator arm can move the recording head radially across the disk so that all concentric tracks can be accessed. The magnetic recording head consists of a small current-carrying coil and magnetic poles that concentrate a magnetic field at the disk's surface. Data is recorded by changing the current in the coils and magnetizing the magnetic material on the disk in a pattern corresponding to the binary data. In modern disk drives, the read-back of the signal is accomplished by a separate read element in the head that makes use of magnetoresistive materials to convert magnetic fields into electrical signals.

The embodiments described herein can be used in a hard disk drive or a solid state medium and use acoustically assisted magnetic recording (AAMR). In these embodiments, otherwise unwriteable high-coercivity media (which is a prerequisite for thermally stable high-density data storage) are made amenable to recording by lowering their coercivity via strain induced by acoustic waves. The use of acoustic waves temporarily and locally reduces the magnetic field required to record information on a magnetic recording medium. The process makes use of the magnetostrictive property of a magnetic material by which the magnetic anisotropy of the material is changed by strain. The result of such a change is a reduction in the coercive field, i.e., the magnetic field required to reverse the magnetization direction. Because acoustic waves cause strain, the passage of an acoustic wave through a magnetic material can be used to reduce its coercive field. In a particular application, a beam of acoustic waves, focused at a point in a hard disk drive where magnetic recording is taking place, can enable the use of higher coercivity recording media and consequently enable higher recording densities. The embodiments described herein do not require use of a laser, although a laser can be used if desired.

Figure 1:
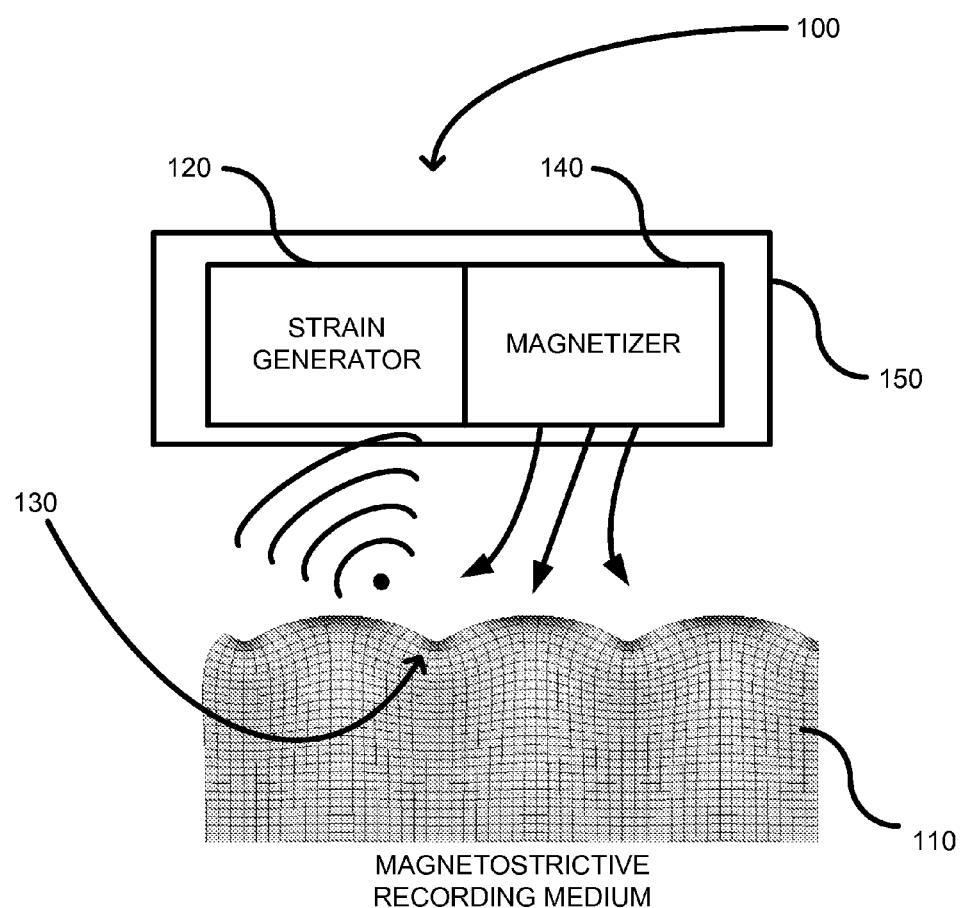
FIG. 1 shows a strain generator used to strain a magnetostrictive material, such as by using an acoustic transducer.

FIG. 1 is an example of a system 100 for recording data on a recording medium 110. The recording medium 110 can be within a hard disk drive or a solid state memory. The recording medium can have various properties, such as magnetic anisotropy and magnetostriction. Magnetic anisotropy is a property of magnetic materials which favors magnetization in certain directions within the material while making it difficult to magnetize in other directions. Anisotropy is desired in magnetic recording media as it keeps the magnetization from reversing itself after recording and makes the recorded magnetic patterns stable. Higher density magnetic recording requires higher anisotropy magnetic materials in the recording layer. Magnetostriction is a property of some magnetic materials in which length of a sample changes depending on the direction of strength of magnetization. In the associated inverse effect, the magnetic anisotropy can be increased or decreased by strain in the material. In the present embodiments, it is desired to use a material with high magnetostriction and high anisotropy. The magneto strictive material can be any of a variety of materials having ferromagnetic properties. In some embodiments, the magnetostrictive material has a high coercivity, such as above one Tesla. Examples of magnetostrictive materials include galfenol (an alloy of iron and gallium), iron/platinum, iron/palladium, iron/platinum/palladium, samarium/cobalt, and combinations thereof. Other magnetostrictive materials having high coercivity can be used.

As can be seen, a strain generator 120, can be used to generate an acoustic wave, which converges to a focal point 130 where data is to be recorded on the recording medium 110. Acoustic waves may be waves of compression and rarefaction, waves of shear strain, or a combination of both. It may be expedient to generate a surface acoustic wave, which is a mode of acoustic wave that travels along the surface of a material. It consists of both compressional as well as shear components. The acoustic waves can be generated using a transducer including one or more electrodes and a piezoelectric material, which is a material that changes shape in the presence of electric fields. Piezoelectric materials are often used in acoustic transducers to convert electrical signals to acoustic waves. An example piezoelectric material is quartz, but other materials that exhibit piezoelectrical behaviors can be used and are well known in the art, such as Lithium Niobate ($LiNbO_2$), Lead Zirconium Titanate (PZT), etc. To converge the waves to a focal point, the strain generator can use one or more transducers arranged in an arcuate shape. Alternatively, an acoustic lens can be used in conjunction with one or more transducers. In either case, the acoustic waves converge at the focal point 130, which is coincident with the target point to write data.

A magnetizer 140 can be used in order to write the data at the target point, once the magnetostrictive recording medium is appropriately strained at the target point. The magnetizer 140 can be a magnetic recording head including a coil and magnetic poles used to concentrate a magnetic field at the target point 130. The strain generator 120 can move in correspondence with the magnetizer, such as when both are located on a same slider 150. However, as described more fully below, both the magnetizer and strain generator can be positioned separately (in spaced relation) but move dependently.

When arranged such that the magnetic field and peak strain from the acoustic wave coincide at the target point 130 in the magnetic recording layer 110, the magnetic anisotropy at the coincidence point is lowered such that the magnetization can be reversed at that point. In its unstrained state, the magnetic layer may have an anisotropy which is too high for conventional magnetic recording heads to affect, providing it with stability against thermal demagnetization. More specifically, the system 100 is designed such that the waves from the strain generator 120 are focused to converge at the target point 130. Thus, maximum strain amplitude is achieved at only one specific point and has minimal effect on the rest of the recording layer. A clear advantage in efficiency is achieved by having focused acoustic energy only at the target point. The specific location at which recording takes place may be determined by the position of maximum strain in the acoustic wave, the position of the maximum magnetic field, or a combination of both.

For the sake of efficiency and simplicity of integrating the acoustic transducers, the system can be set up to use surface acoustic waves. These waves travel only on the surface of a structure (such as a magnetic recording disk) and can be conveniently excited using piezoelectric transducers fabricated by thin-film processing technology. A common way of generating surface acoustic waves is through the use of interdigitated metal electrodes patterned on top of a piezoelectric material. Such interdigitated transducers are used to generate surface acoustic waves of well-controlled frequency, direction and amplitude.

Figure 2:
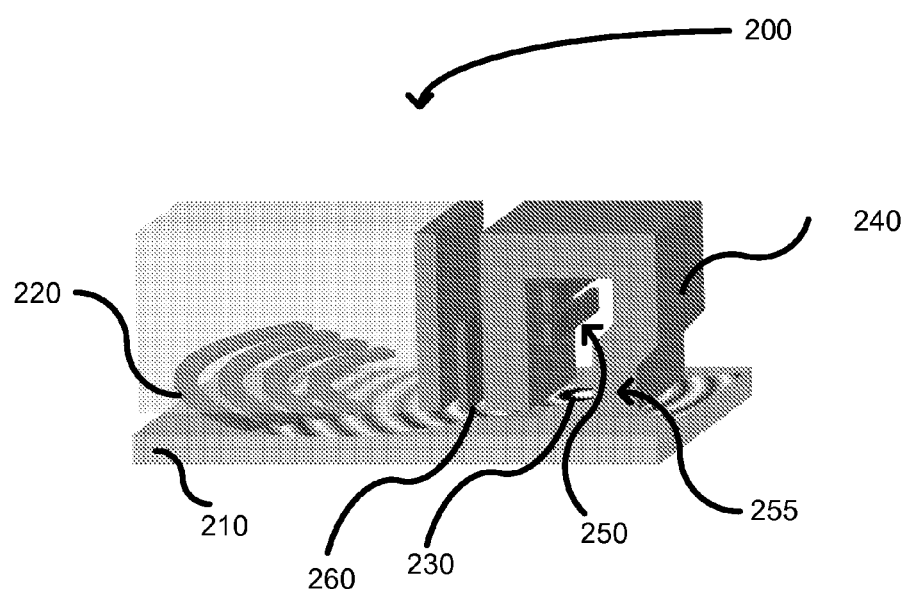
FIG. 2 shows a detailed embodiment with an array of arcuate-shaped transducers used to generate acoustic waves that converge at a focal point.

FIG. 2 shows an example slider 200 passing in spaced-relation above a magnetostrictive material 210. Any magnetostrictive materials can be used as described above. The slider 200 includes an array of archuate-shaped transducers 220 designed to generate acoustic waves that converge at a focal point 230. A writing head 240 includes a current-carrying coil 250 and one or more magnetic write poles 255 that concentrates the magnetic field at the point of writing. The shape of the transducers 220 and the distance between the transducers and the write pole 255 can be dictated by the focal point 230. That is, whatever the shape or distance, it is desirable that the acoustic waves converge at the focal point 230 such that it is positioned beneath the write pole 255. In this way, the focal point represents maximum strain on the magnetostrictive material and the magnetic field emanating from the write pole 255 can be used to write data using minimal energy. The data written can be based on a direction of magnetization. For example, a digital 1 can magnetize the strained material in one direction, while a digital 0 can magnetize in an opposite direction. A reader 260 can be used to read data from the magnetostrictive material 210. The reader 260 does not require the magnetostrictive material to be strained while reading.

Figure 3:
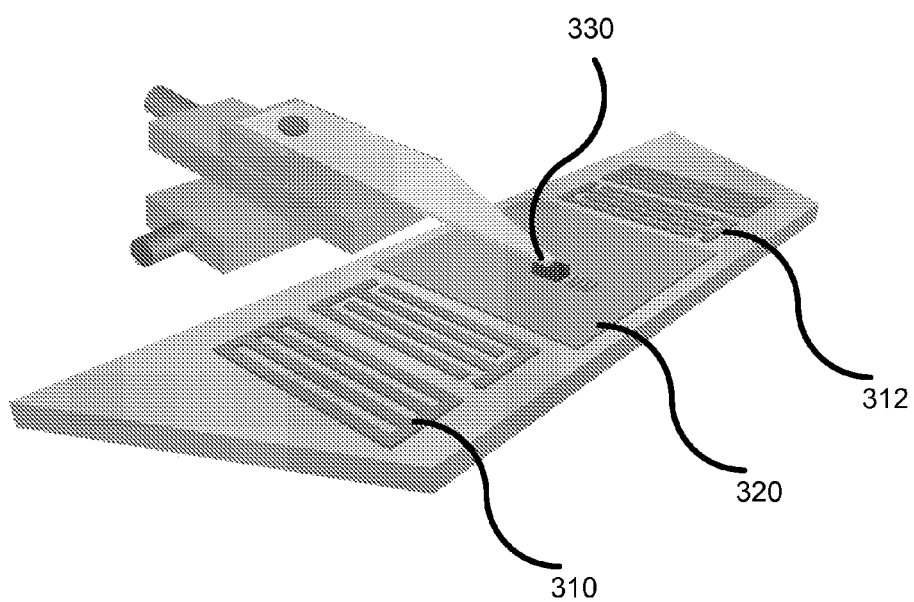
FIG. 3 shows an example of transducers formed from an array of interdigitated conductors on opposing sides of a magnetostrictive material and a recording head to write and read data on the magnetostrictive material.

FIG. 3 shows an example embodiment with stationary transducers 310, 312 on opposite sides of a magnetorestrictive material 320. The transducers 310, 312 are formed from interdigitated conductive fingers with underlying piezoelectric material. Acoustic waves are formed on both sides of the magnetostrictive material 320 through interaction of the transducers 310, 312 when an AC current is applied to the transducers. The conductive fingers of the transducers 310, 312 are positioned within a plane that is parallel to a plane formed by the magnetostrictive material. The acoustic waves traveling from both sides can collide at a position over the magnetostrictive material so as to strain the material. A movable head 330 can be used to write data through magnetization by positioning the head at desired point over the magnetostrictive material 320 and writing data in a desired direction of magnetization. The timing of when the head 330 writes the data should be coordinated with when the transducers 310, 312 generate the acoustic wave.

Figure 4:
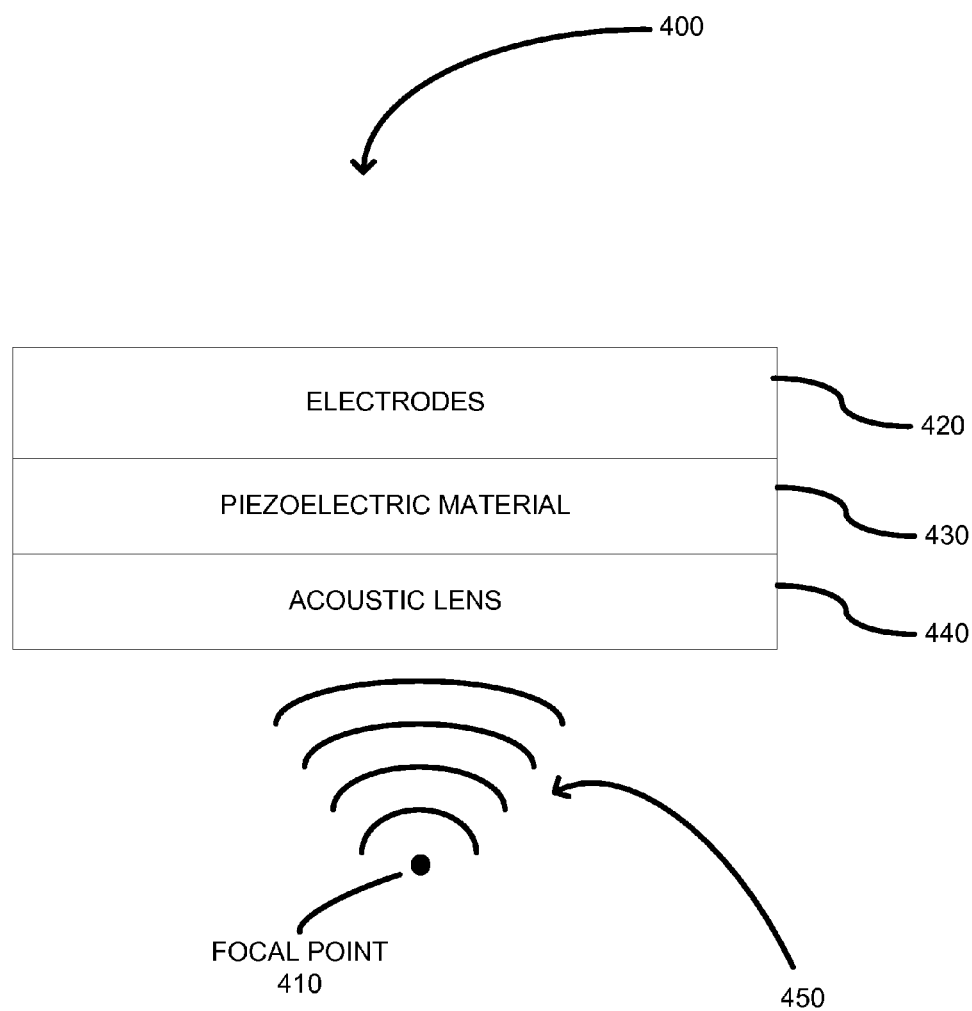
FIG. 4 shows another embodiment that can be used for generating a converging acoustic wave by use of an acoustic lens.

FIG. 4 is an example embodiment of a strain generator, which in this example is an acoustic wave generator 400 for generating acoustic waves that converge at a focal point 410. The acoustic wave generator 400 can include one or more electrodes or conductors 420, a piezoelectric material 430 and an acoustic lens 440. The conductors 420 in this embodiment need not be arcuate in shape. Rather, the conductors 420 can be straight electrical paths, such as the interdigitated fingers described in relation to FIG. 3. The piezoelectric material can be positioned adjacent the conductors to form one or more transducers. When an AC voltage is applied to the conductors, the piezoelectric material generates acoustic waves. An acoustic lens 440 can be designed to bend the acoustic waves by using multiple transmission mediums through which sound travels at different speeds. The output of the acoustic lens 440 is a converging acoustic signal 450 that converges acoustic energy to the focal point 410.

Figure 5:
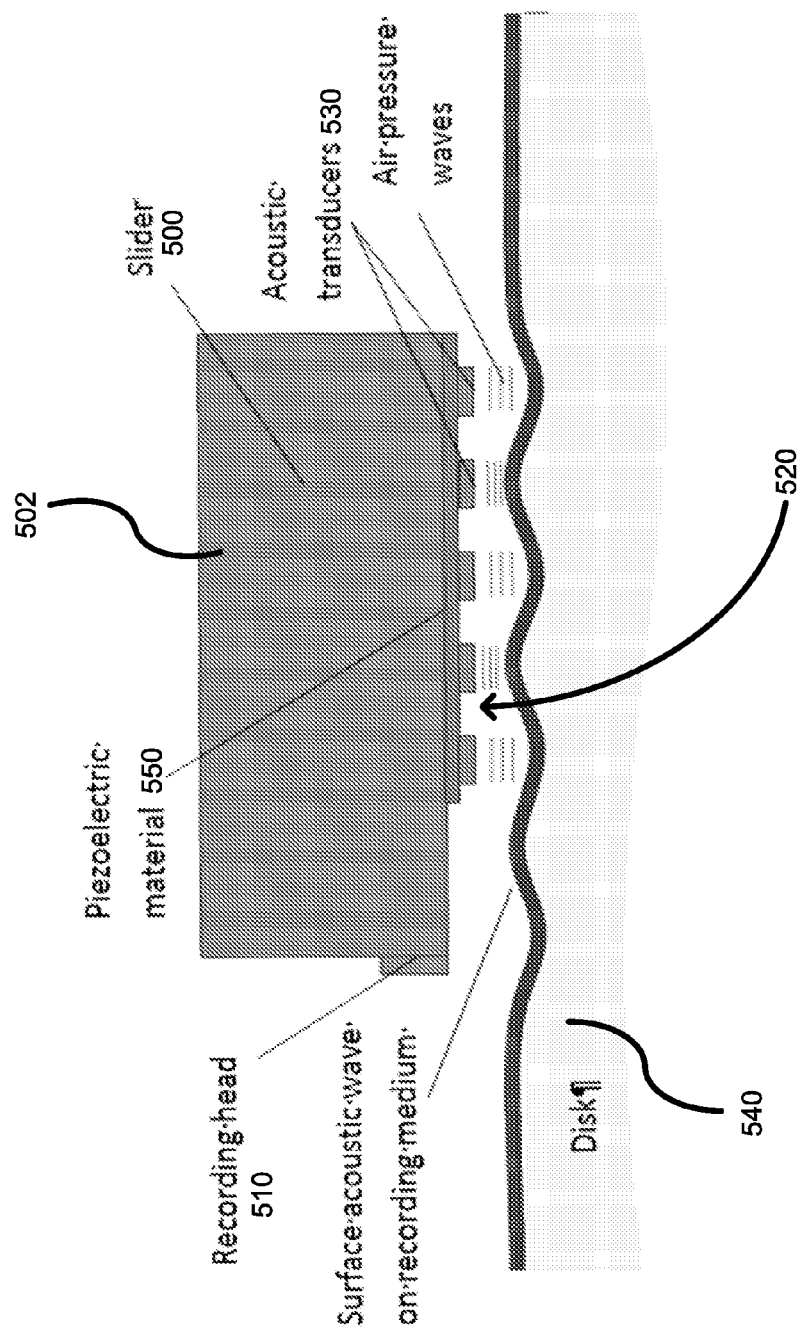
FIG. 5 shows an embodiment of a slider having an array of transducers for generating converging acoustic waves.

FIG. 5 is an example embodiment of a movable slider 500 that includes a main slider body 502 used for mounting both a recording head 510 and straining components, shown generally at 520. The straining components 520 include a plurality of transducers 530. The transducers 530 can be formed in an array (such as interdigitated transducers) on a bottom surface of the slider 500 and coupled acoustically (i.e. by pressure waves) to a disk 540 through an air bearing. The spacing and excitation frequency of the transducer array 530 is chosen to match those of the surface acoustic wave modes of the disk 540. The transducer array 530 can have an arcuate shape so as to generate converging acoustic waves. The transducer array 530 includes a layer of piezoelectric material 550 positioned between conductors of the array and the slider body 502 to generate the acoustic waves. More specifically, an electrical field created by the conductors (through the application of AC voltage) interacts with the piezoelectric material to generate acoustic waves, as is well understood in the art. The acoustic waves can be bulk acoustic waves or surface acoustic waves and can converge at a focal point to strain magnetostrictive material on a surface of the disk 540.

Figure 6:
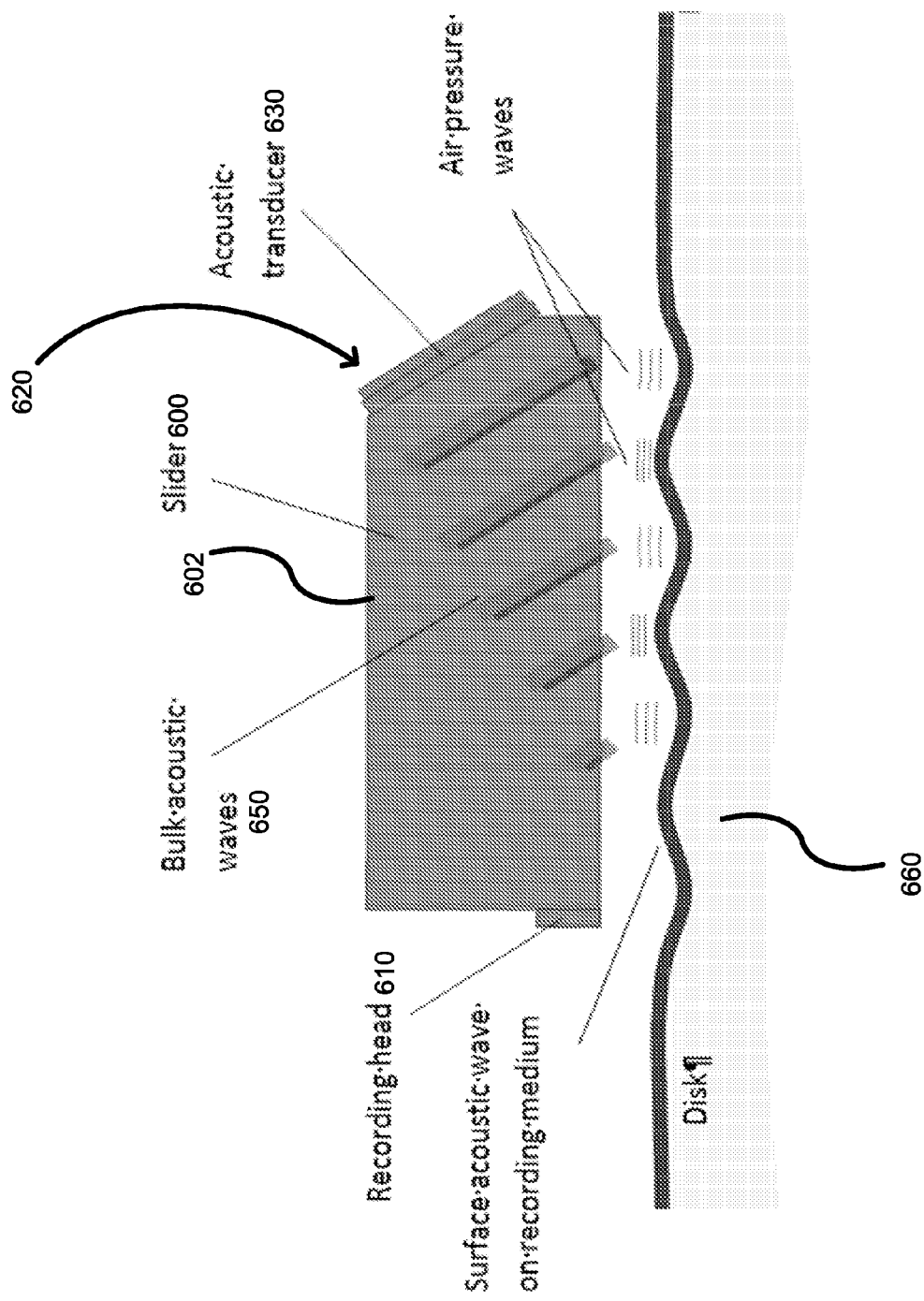
FIG. 6 shows an embodiment of a slider wherein the transducer is placed at an angle with respect to the magnetostrictive material.

FIG. 6 is another example embodiment of a movable slider 600 having a body 602 for mounting a recording head 610 and straining components, shown generally at 620. The straining components 620 include an acoustic transducer 630 made of conductors and adjacent piezoelectric material integrated with the slider 600 of the recording head 610. The straining components 620 produce bulk acoustic waves that couple to surface acoustic waves on the disk through the air bearing. Coupling to surface acoustic wave modes is achieved through angling the bulk acoustic waves towards the air bearing surface such that the spacing and velocity of wave fronts of the bulk acoustic wave appearing at the slider surface matches those of the surface acoustic wave in the recording medium. Such angling can be achieved by mounting the straining components 620 on the slider at an angle, with the optimum angle determined by the relative difference in velocity between the bulk acoustic wave and the surface acoustic wave. As can be seen, a corner of the slider's body 602 is cut away to provide an angled surface upon which to mount the straining components 620. The bulk acoustic waves 650 can be seen converging to a focal point on the recording medium 660 below the recording head 610 to provide maximum strain at a focal point below the recording head.

Figure 7:
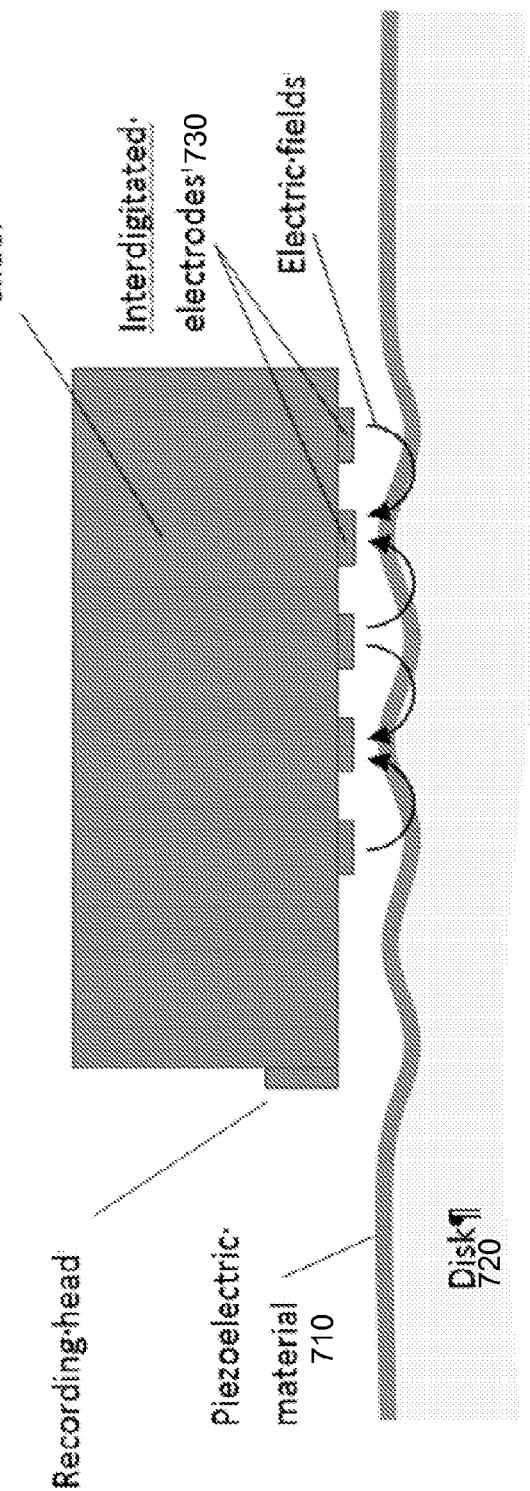
FIG. 7 shows an embodiment of a slider wherein a portion of the transducer is located on the slider (i.e., the electrodes) and the piezoelectric material is located on the disk.

FIG. 7 shows another embodiment wherein a piezoelectric material 710 can be positioned on a disk 720 either above or below a magnetic recording layer. Electrical conductors 730, such as a set of interdigitated electrodes, can be arranged on a bottom of a slider 740 which, by proximity to the surface of the disk 720, induces strain in the piezoelectric material 710. Thus, the conductors are movable (due to being mounted on the slider) relative to and independently of the piezoelectric material 710, which is fixed on the disk 720. This embodiment also illustrates that the piezoelectric material need not be in contact with the electrodes 730, but should be proximate. As in previous embodiments, the transducer configuration formed by the combination of conductors and piezoelectric material can be used to generate converging acoustic waves.

Figure 8:
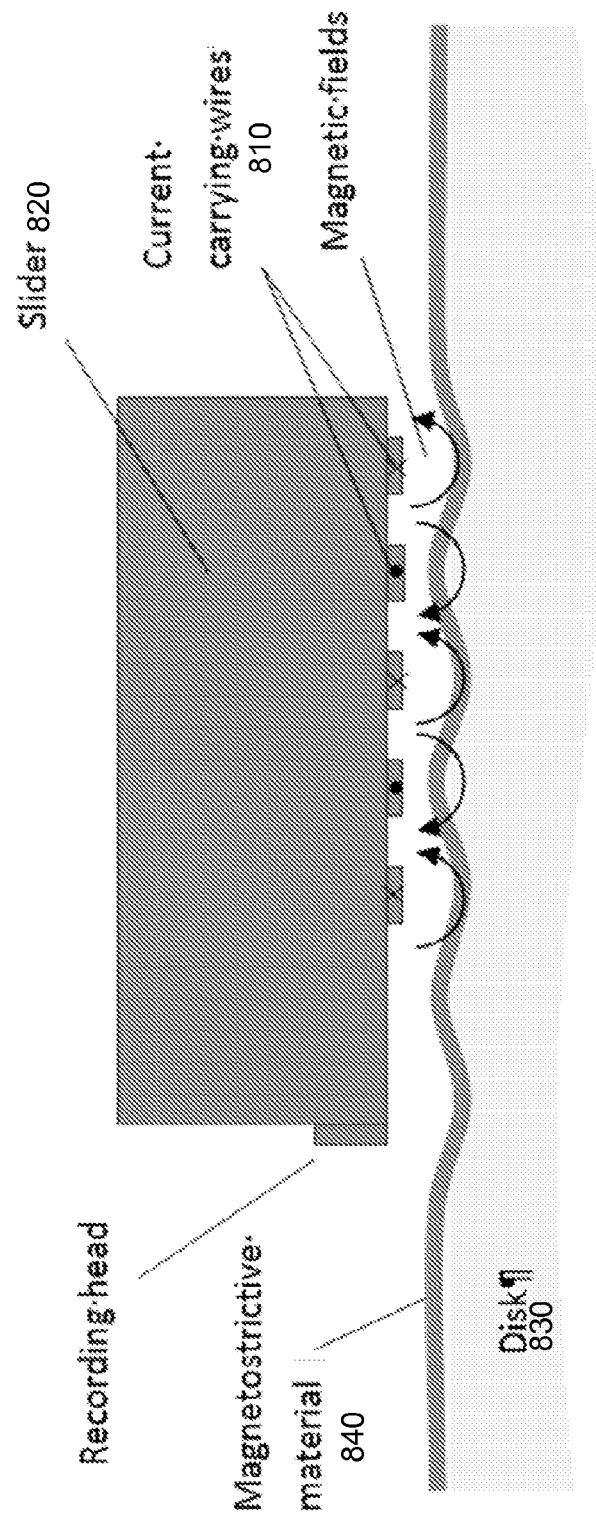
FIG. 8 shows an embodiment of a slider wherein a portion of the transducer is located on the slider (electrodes) and magnetostrictive material is used to generate acoustic waves.

FIG. 8 shows yet another embodiment, where an array of current carrying wires or conductors 810 is arranged on the bottom of a recording head slider 820, which, by proximity to a surface of a disk 830, induces strain in a magnetostrictive material 840 that has been deposited onto the disk either above, below or integral to the magnetic recording layer. In this embodiment, a piezoelectric material is not needed. However, the magnetostrictive material 840 used to generate the strain should have a lower coercivity than the recording medium below the material 840. The magnetostrictive material 840 in this embodiment generates acoustic waves that are used to strain another magnetostrictive material having a different coercivity and designed for recording data.

Figure 9:
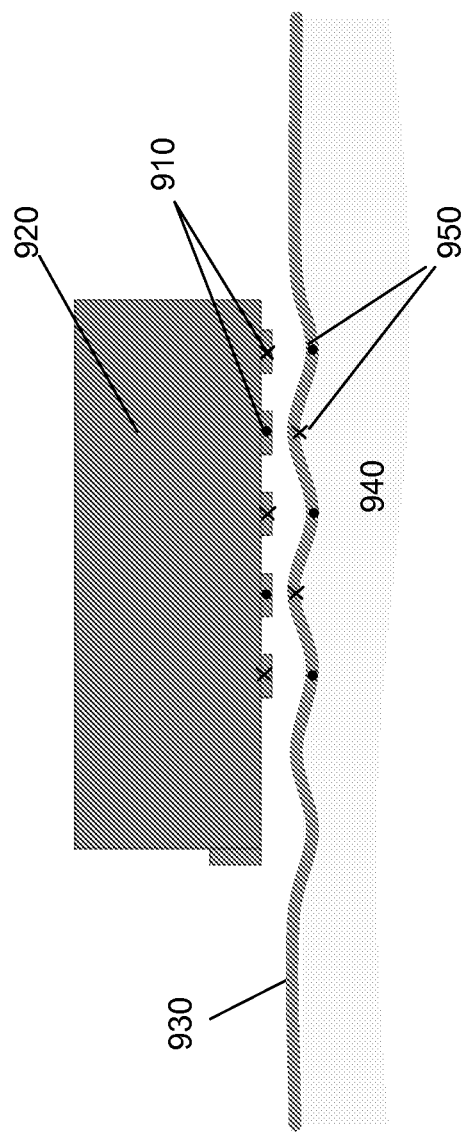
FIG. 9 shows an embodiment of a slider wherein a portion of the transducer is located on the slider (electrodes) and a conductive material is placed on the disk so as to generate acoustic waves.

FIG. 9 shows yet another embodiment, where an array of wires carrying an alternating current 910 is arranged on the bottom of a recording head slider 920, which, by proximity to a conductive material 930 on the surface of a disk 940, inductively generate currents 950 within this conductive material. Lorentz forces between the current in the wires and the currents induced in the conductive material produce strain on the disk, generating acoustic waves at twice the frequency of the alternating current. In this embodiment, a piezoelectric material is not needed. The conductive material may be the same, or distinct from the magnetostrictive recording material. In the case that it is distinct, it may be placed above or below the magnetostrictive material.

Figure 10:
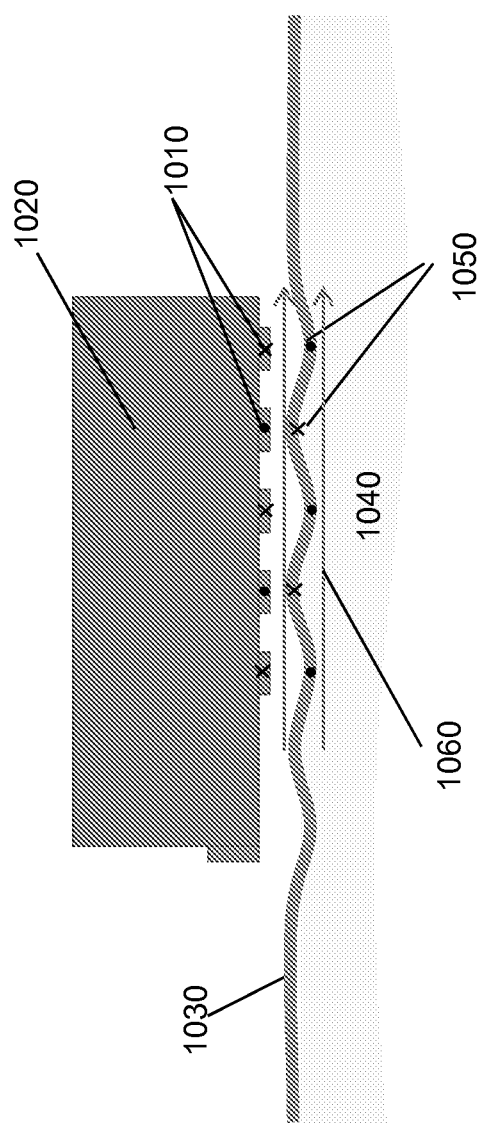
FIG. 10 shows an embodiment of a slider wherein a portion of the transducer is located on the slider (electrodes) and a conductive material is placed on the disk and a constant magnetic field is imposed on the conductive material.

FIG. 10 shows yet another embodiment, where an array of wires carrying an alternating current 1010 is arranged on the bottom of a recording head slider 1020, which, by proximity to a conductive material 1030 on the surface of a disk 1040, inductively generate currents 1050 within this conductive material. A constant magnetic field 1060, generated by separate means, such as by a permanent magnet, is imposed to be perpendicular to the induced currents and the disk surface. The resulting Lorentz forces on the currents induced in the conductive material produce strain on the disk, generating acoustic waves at the same frequency as the alternating current. In this embodiment, a piezoelectric material is not needed. The conductive material may be the same, or distinct from the magnetostrictive recording material. In the case that it is distinct, it may be placed above or below the magnetostrictive material.

Figure 11:
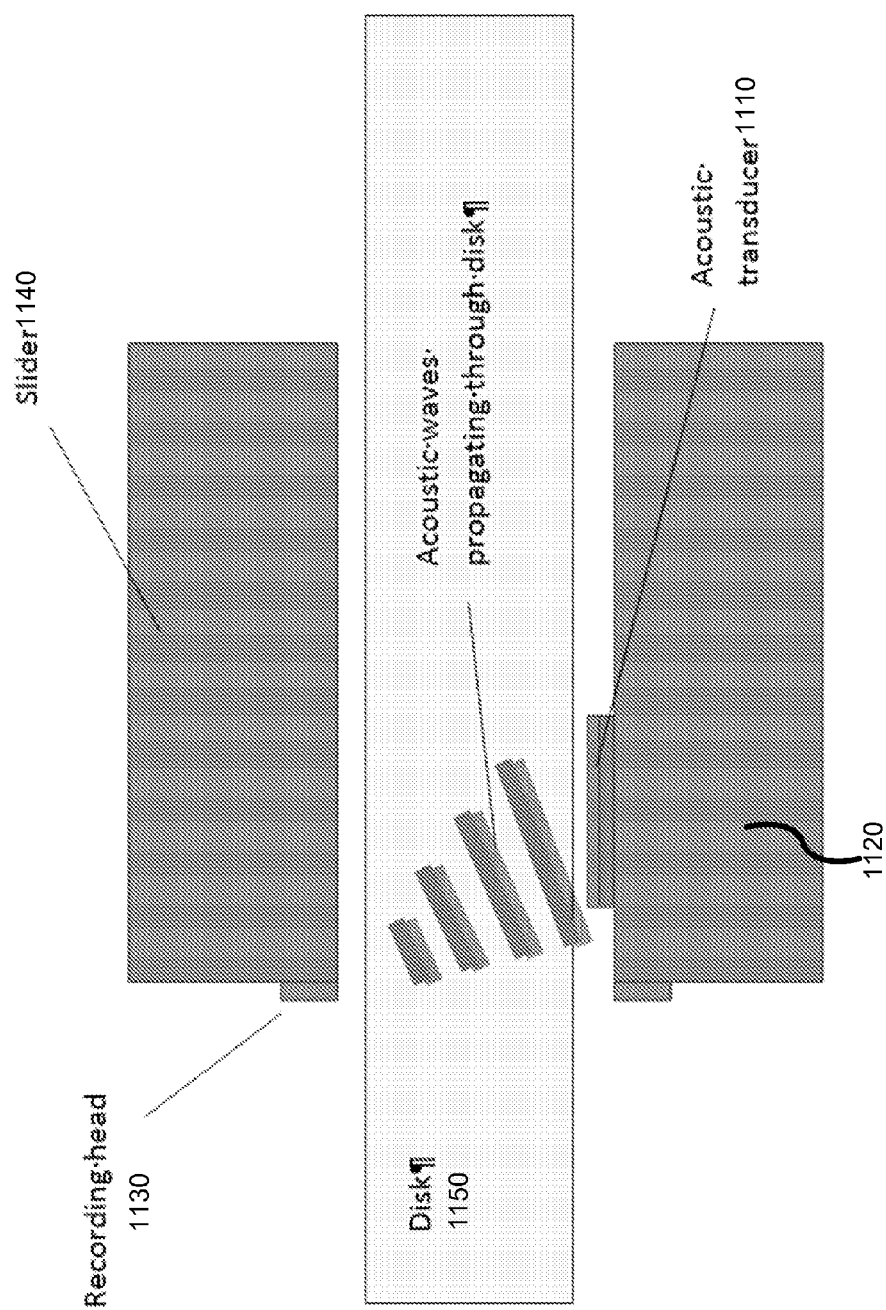
FIG. 11 shows an embodiment wherein a recording head is on an opposite side of the disk from the acoustic transducer.

FIG. 11 shows an embodiment wherein a transducer 1110 (formed from conductors and corresponding piezoelectric material) is positioned on a first slider 1120 and a recording head 1130 is positioned on a second slider 1140. The two sliders 1120, 1130 can move synchronously so as to ensure the position of the recording head 1130 always corresponds to a focal point of acoustic waves generated by the transducer. The acoustic transducer 1110 is integrated with the slider 1120 positioned on the opposite side of a disk 1150 relative to the recording head 1130. The acoustic transducer 1110 transmits acoustic waves through the disk 1150 towards the active magnetic recording head 1130 so that the focal point of the acoustic waves is on a surface of the disk 1150 below the recording head 1130.

Figure 12:
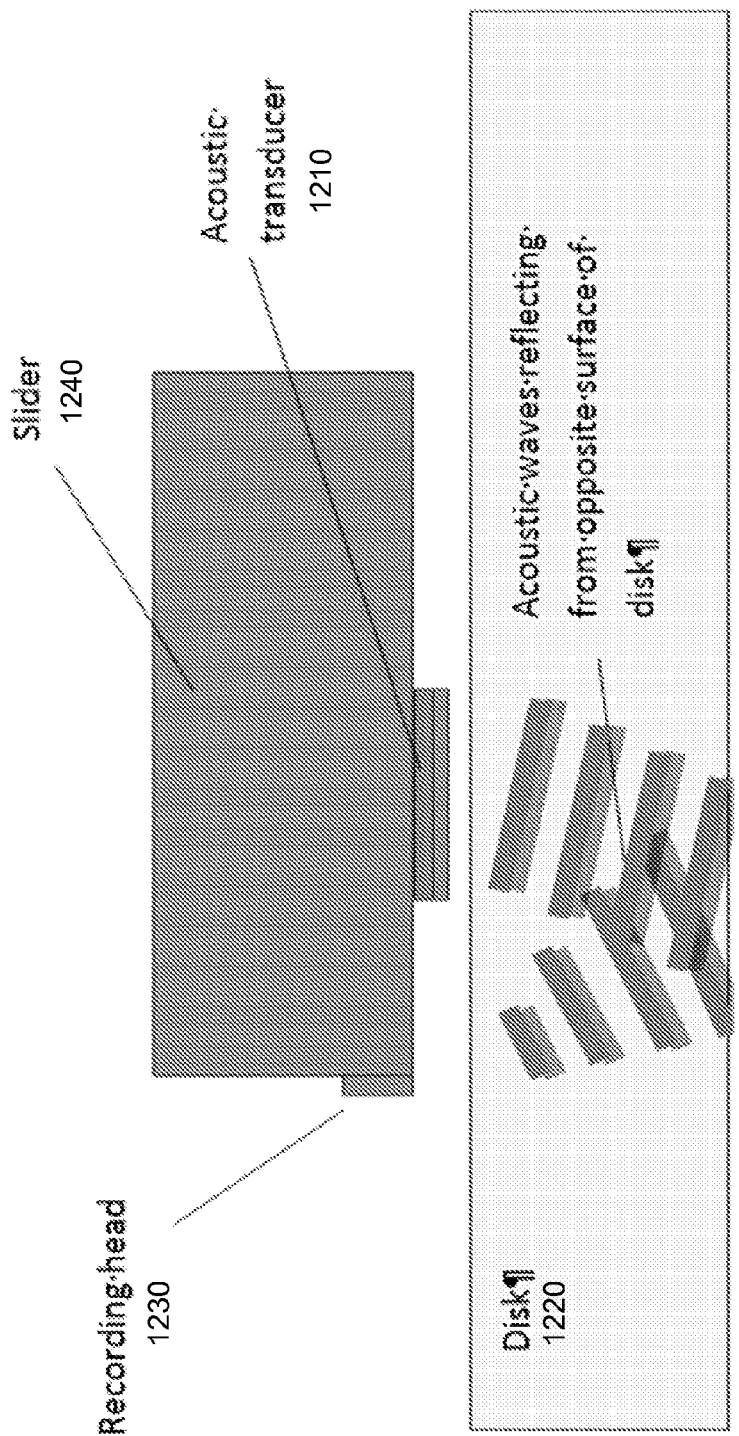
FIG. 12 shows an embodiment wherein the acoustic waves reflect from an opposite surface of the disk before converging.

FIG. 12 shows an embodiment where an acoustic transducer 1210 is positioned on a same side of a disk 1220 as an active magnetic recording head 1230, but the transducer 1210 transmits acoustic waves through the disk so that the waves reflect from an opposite disk surface and return to converge at a focal point positioned below the active recording head 1230. Thus, both the transducer 1210 and the recording head 1230 are on a same slider 1240.

Figure 13:
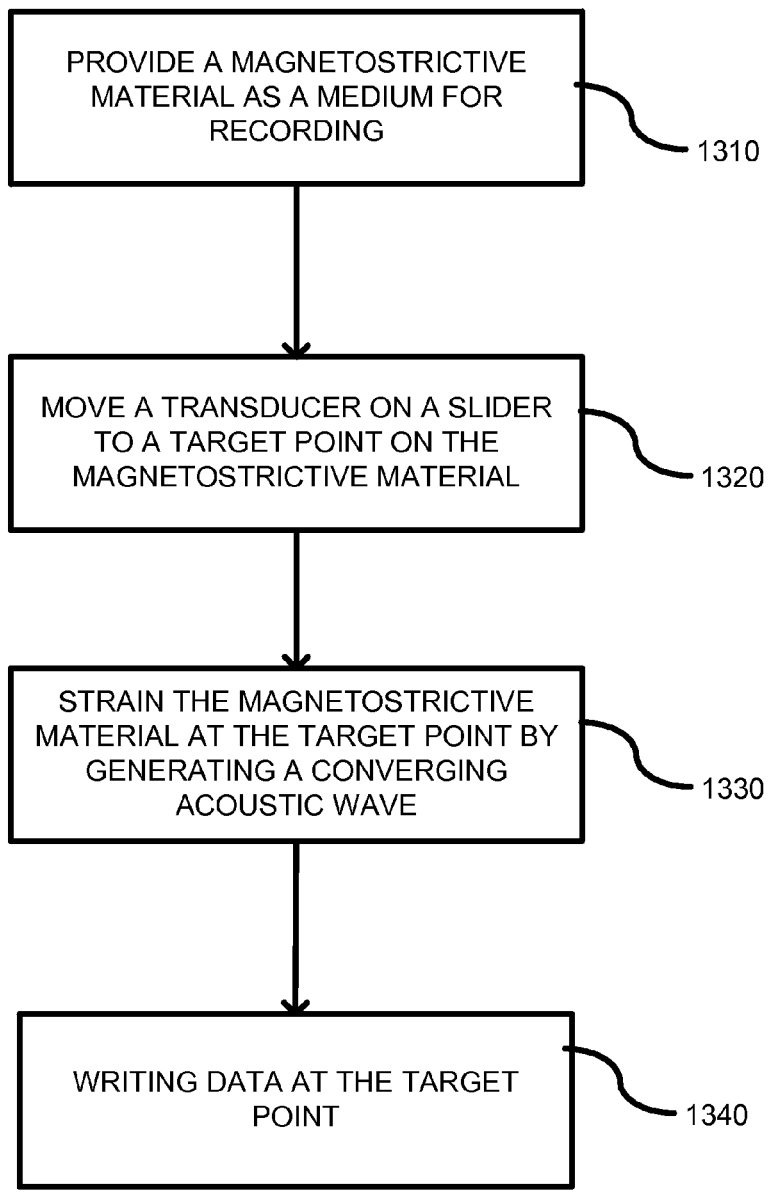
FIG. 13 is a flowchart of an embodiment for writing data on a magnetostrictive material.

FIG. 13 is a flowchart of an embodiment for recording data on a storage device. In process block 1310, a magnetostrictive material is provided as a medium for recording data. As previously described, the magnetostrictive material should have a sufficiently high coercivity for stable magnetization. In process block 1320, a transducer can move on a slider to a target point on the magnetostrictive material. In some embodiments, the transducer can include electrodes and piezoelectric material placed adjacent to the electrodes. The transducer can be an arcuate shape. For example, the electrodes can be formed in an arch shape so that waves generated from the transducer converge at a focal point. In other embodiments, the piezoelectric material can be placed on the disk and only the electrode part of the transducer is on the slider. In still other embodiments, no piezoelectric material is used at all. In yet other embodiments, an acoustic lens can be used to bend the acoustic waves so that they converge at a focal point. In process block 1330, the magnetostrictive material is strained at the target point by generating a converging acoustic wave. The converging acoustic wave is targeted to a focal point at which the material has maximum strain. In process block 1340, the data can be written at the target point using a recording head on the slider.

Figure 14:
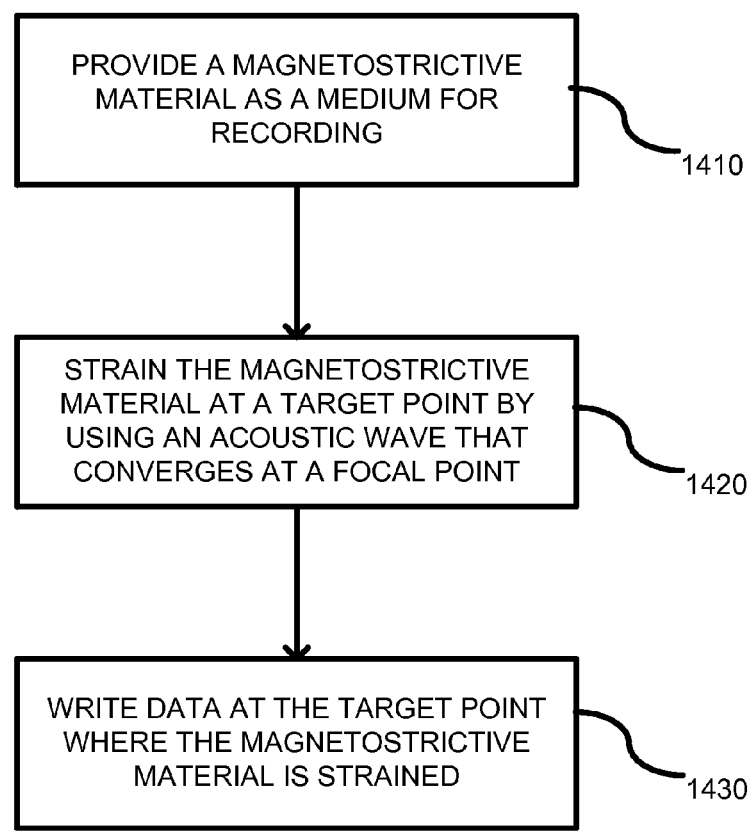
FIG. 14 is a flowchart according to another embodiment for writing data on a magnetostrictive material.

FIG. 14 shows a flowchart according to another embodiment. In process block 1410, a magnetostrictive material is provided as a medium for recording. The magnetostrictive material changes properties when strained, so that data can be written when the material is in a strained state. In process block 1420, the magnetostrictive material is strained at a target point by using an acoustic wave that converges at a focal point. In process block 1430, data is written at the target point where the magnetostrictive material is strained.

Figure 15:
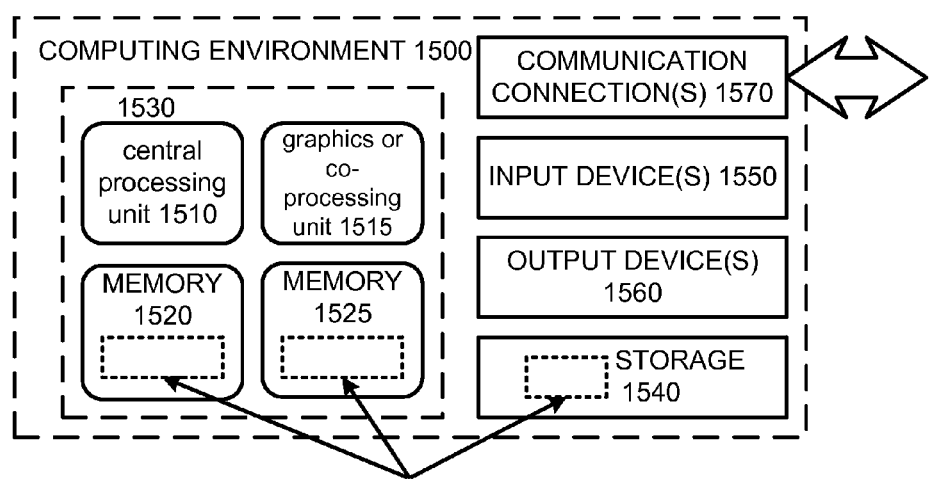
FIG. 15 is an embodiment of control circuitry that can be used to implement any of the embodiments described herein.

FIG. 15 depicts a generalized example of a suitable computing environment 1500 in which the described innovations may be implemented. The computing environment 1500 is not intended to suggest any limitation as to scope of use or functionality, as the innovations may be implemented in diverse general-purpose or special-purpose computing systems. For example, the computing environment 1500 can be any of a variety of computing devices (e.g., desktop computer, laptop computer, server computer, tablet computer, media player, gaming system, mobile device, etc.)

With reference to FIG. 15, the computing environment 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s). The memory 1520, 1525 stores software 1580 implementing one or more innovations described herein, in the form of computer-executable instructions suitable for execution by the processing unit(s).

A computing system may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing environment 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing environment 1500. For video encoding, the input device(s) 1550 may be a camera, video card, TV tuner card, or similar device that accepts video input in analog or digital form, or a CD-ROM or CD-RW that reads video samples into the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

For example, the transducer was described as being fully included on the slider and, in some embodiments, as partially included on the slider and partially on the disk. In other embodiments, the transducer can be fully moved to the disk so as to be on or within the disk. For example, the disk can have embedded conductors or conductors on the surface of the disk so as to generate acoustic waves using the techniques described herein.

Additionally, any of the embodiments herein can have the electrode portion of the transducer in an arcuate shape so as to converge the acoustic waves to a focal point. Alternatively, other techniques for converging the acoustic waves to a focal point can be used in any of the embodiments, such as using an acoustic lens.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of recording data on a storage device, comprising:
    providing a magnetostrictive material as a medium for recording, the magnetostrictive material changing properties when strained;
    moving at least one transducer on a slider to a target point on the magnetostrictive material to be recorded, wherein the at least one transducer is in spaced-relation with the magnetostrictive material;
    generating acoustic waves that converge and strain the magnetostrictive material at the target point using the at least one transducer; and
    writing the data at the target point where the magnetostrictive material is strained.

2. The method of claim 1, wherein the target point is a focal point of the acoustic waves generated by the transducer.

3. The method of claim 2, wherein generating the acoustic waves includes using an array of arcuate-shaped transducers to generate the converging acoustic waves.

4. The method of claim 1, wherein the magnetostrictive material is within a hard disk drive.

5. The method of claim 1, wherein the at least one transducer includes electrodes adjacent a piezoelectric material.

6. Method of claim 1, wherein the at least one transducer includes conductors positioned on the slider such that alternating current in the conductors induces electrical current in a conductive material integral to or joined to the magnetostrictive material such that magnetic forces between the alternating current and current induced in the conductive material produce the straining of the magnetostrictive material.

7. Method of claim 1, wherein the at least one transducer includes conductors positioned on the slider such that alternating current in the conductors induces electrical current in a conductive material integral to or joined to the magnetostrictive material, which in combination with a static magnetic field results in magnetic forces to produce the straining of the magnetostrictive material.

8. The method of claim 1, wherein the at least one transducer includes electrodes positioned on the slider and piezoelectric material positioned on the magnetostrictive material.

9. The method of claim 1, wherein a recording head is positioned on the slider and the recording head produces magnetic fields needed to magnetize the magnetostrictive material at the target point to be recorded.

10. The method of claim 1, wherein the magnetostrictive material is positioned on a first side of a substrate supporting the magnetostrictive material, and the transducer is positioned on a second side of the substrate opposite the first side where the magnetostrictive material is located.

11. The method of claim 1, wherein straining is accomplished without the use of a laser.

12. The method of claim 1, wherein the straining is accomplished using an array of transducers, wherein the spacing and excitation frequency of the transducer array is chosen to match those of surface acoustic wave modes of a disk containing the magnetostrictive material.

13. The method of claim 1, further including using transducers positioned at an angle with respect to the magnetostrictive material so as to convert a bulk acoustic wave produced by the transducer to a surface acoustic wave on the magnetic material.

14. The method of claim 1, wherein an acoustic wave is directed to reflect from a back surface of a substrate supporting the magnetostrictive material and return to the magnetostrictive material at the target point where the recording head is writing.

15. An apparatus for recording data, comprising:
a magnetostrictive material usable as a medium for recording, the magnetostrictive material changing properties when strained;
at least one transducer to generate an acoustic wave to strain the magnetostrictive material at a point, the at least one transducer being movable relative to the magnetostrictive material;
a recording head designed to move in conjunction with the at least one transducer to record data on the magnetostrictive material at the point where it is strained.

16. The apparatus of claim 15, wherein the at least one transducer includes conductors positioned on the slider such that alternating current in the conductors induces electrical current in a conductive material integral to or joined to the magnetostrictive material such that magnetic forces between the alternating current and current induced in the conductive material produce the straining of the magnetostrictive material.

17. The apparatus of claim 15, wherein the at least one transducer includes piezoelectric material positioned on the magnetostrictive material.

18. The apparatus of claim 17, wherein the at least one transducer includes a plurality of arcuate-shaped electrodes designed to generate acoustic waves so as to converge at the focal point.

19. The apparatus of claim 18, further including an acoustic lens to bend the acoustic waves so that they converge at the focal point.

20. The apparatus of claim 15, wherein the magnetostrictive material is located on a disk and the at least one transducer includes conductors positioned on or within the disk.

21. A computer-readable storage medium having instructions thereon to execute a method of recording data on a storage device, the method comprising:
providing a magnetostrictive material as a medium for recording, the magnetostrictive material changing properties when strained;
straining the magnetostrictive material at a target point on the magnetostrictive material to be recorded, the straining being accomplished without using a laser; and
writing the data at the target point where the magnetostrictive material is strained.

22. The computer-readable storage medium of claim 21, wherein the straining is accomplished using acoustic waves that converge at the target point.

* * * * *